Oct. 16, 1928.
A. M. CURTIS
1,688,038
PROTECTIVE DEVICE
Filed April 30, 1926
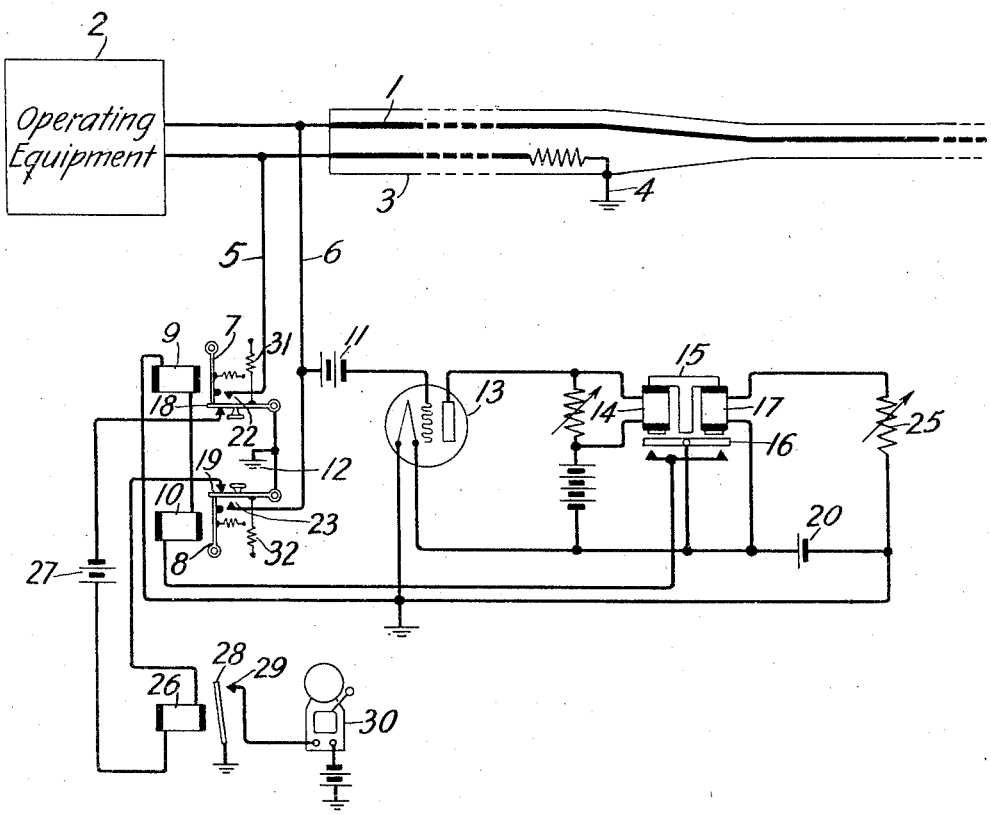
Inventor:
Austen M. Curtis.
by  J.E.Roberts  Att'y.

Patented Oct. 16, 1928.

1,688,038

UNITED STATES PATENT OFFICE.

AUSTEN M. CURTIS, OF EAST ORANGE, NEW JERSEY, ASSIGNOR TO BELL TELEPHONE LABORATORIES, INCORPORATED, OF NEW YORK, N. Y., A CORPORATION OF NEW YORK.

PROTECTIVE DEVICE.

Application filed April 30, 1926. Serial No. 105,731.

This invention relates to protective means for electric circuits and particularly to means for protecting signaling circuits from excessive potentials which may in any way damage the conductor or signaling apparatus.

Electric circuits are frequently subject to excessive voltages due to short circuits on adjacent power conductors, or faulty insulation, and in many cases are subject to atmospheric discharges which may cause injury to apparatus associated therewith, or damage the conductors themselves. In the case of submarine cables, damage to the conductors must be particularly guarded against since the cost of raising and repairing the cables is very large.

It is an object of the present invention to protect electric circuits from excessive voltages and particularly to guard submarine signaling circuits against excessive voltages such as atmospheric discharges.

This object is attained by dissipating the potential applied to a circuit whenever its value becomes such that damage might result. This may be conveniently accomplished by utilizing a potential responsive device controlling the operation of a ground connection to dissipate the excessive potential.

The invention will be more clearly understood by reference to the drawing which illustrates one embodiment of the invention as associated with submarine signaling apparatus.

According to the form of the invention illustrated a signaling conductor 1 is connected with the operating equipment 2 for receiving and transmitting signals. An artificial line or other balancing means is associated with the signaling equipment and as illustrated may be connected with a sea earth through a similar conductor 3 grounded at 4. These two conductors 1 and 3 are placed, preferably in the same cable sheath and are designed to neutralize the effect on the signaling equipment of any interfering voltages which may affect the shore end of the cable. For this reason, a very high potential may be impressed upon both the sea earth conductor and the signaling conductor from some external source, and, without any previous warning of the approach of such disturbances having been given by the received signals, the potential impressed on these conductors may become so great as to endanger the operating equipment or even the insulation of the conductors themselves.

In order to prevent damage of the above nature the present invention provides means to ground the cable whenever a voltage in excess of a predetermined maximum is applied to the signaling conductor. For this purpose the conductors 1 and 3 are grounded at 12 through conductors 5 and 6 by the operation of the trip arms 18 and 19 which are normally held out of engagement with the contacts 22 and 23 by relay armatures 7 and 8 of relays 9 and 10. The springs 31 and 32 move trip arms 18 and 19 into engagement with contacts 22 and 23 whenever the armatures 7 and 8 are actuated.

The conductor 1 is also connected through conductor 6 and a grid biasing battery 11 to a control element 13 which is preferably a three element electron discharge device. The potential of battery 11 should be so high that no current will flow to earth through the grid circuit of the discharge device during normal signal transmission. The output circuit of this control element, includes the winding 14 of a three-position polar relay 15. The normal plate current of the discharge device during both signaling and non-signaling periods tends to move the armature 16 toward one or the other of the contacts. This movement of the armature is prevented by the opposing action of the current in the winding 17 of the relay supplied by the battery 20 through resistance 25. Battery 20 also supplies the filament heating current. The current in the winding 17, by neutralizing the tendency of the armature to respond to the normal current flow in the winding 14, causes the relay 15 to act as a marginal relay responsive to any material variation in the output current of the discharge device 13. For example, of there should be an increase of the cable potential beyond a predetermined limit fixed by the constants of the circuit, the output current flowing in the winding 14 of the relay would vary sufficiently to cause the relay armature 16 to engage one of its contacts. The engagement of the armature 16 with either one of its contacts completes a circuit from the negative pole of the battery 20 through the windings of relays 9 and 10, the armature 16 of relay 15 and back to the positive pole of battery 20. The relays 9 and 10 are preferably high speed relays operating within a few thousandths of a second so that as soon as this circuit is completed, the relay armatures 7 and 8 are thrown, and trip arms 18 and 19 moved to engage contacts 22 and 23, connecting both the signaling cable and the sea-earth cable to ground, and discharging any excess potential which has been impressed on either.

In the normal released position of the relay armatures 7 and 8, a circuit is completed, through the winding of relay 26 from battery 27, which includes relay and trip arms 18 and 19. The armature 28 of the relay 26 is thereby held out of engagement with its contact 29, and the alarm circuit through signaling bell 30 is held open. Upon the operation of grounding relays 9 and 10 and the movement of armatures 7 and 8 in response to an excess charge on the cable, the circuit including battery 27 and the windings of relay 26 is broken, releasing the armature 28 and completing an alarm circuit, which may include any type of alarm device desired.

The operation of the invention is as follows:

If for any reason an excess potential is impressed upon the signaling conductor, for example, from a lightning discharge near the cable, the increased potential of the conductor will cause a corresponding change in the grid potential of the discharge device 13 and the output current flowing through the winding 14 of the relay 15 will thus be changed. The sensitivity of the space discharge device 13 and its associated relay 15 is adjusted so that, if the potential of the cable is high enough to endanger any portion of the circuit, the change in plate current thus produced will be sufficient to throw the relay armature 16 into engagement with one of its contacts. A circuit will then be completed through relays 9 and 10, actuating the armatures 7 and 8, and releasing trip arms 18 and 19, to ground the two conductors and thus protect both the conductors and the operating equipment against damage. At the same time the circuit of relay 26 will be broken, permitting the armature 28 to engage its contact and complete the alarm circuit. In the preferred form of the invention the relays 9 and 10 are adapted to be held in engagement with the contacts 22 and 23 until manually released, which should only be after tests have been made to insure the safety of the apparatus.

Although in the drawing the cable conductors are shown as being grounded directly by the operation of the device, under certain conditions it may be found desirable to ground these conductors through a suitable impedence. For example, if the cable is grounded directly by the operation of the device, a surge impressed upon the cable at some distance remote from the terminal, upon reaching the terminal will be reflected and travel outward on the cable until entirely dissipated, and possibly endanger the insulation of the cable at a point remote from the terminal. This difficulty may be overcome by arranging the device so that instead of grounding the conductors directly it grounds them through a suitable network having an impedance approximately equal to the surge impedance of the cable itself. It is of course obvious that other means may be employed for controlling the operation of the relays 9 and 10, or other types of relays employed to produce the same result, and further changes and variations made in the circuit and arrangement of parts without departing from the spirit and scope of the invention.

What is claimed is:

1. A protective device for an electric circuit comprising a space discharge device having separate input and output circuits, the input circuit being connected to said electric circuit and said discharge device being responsive to changes in the potential of said circuit, means in the output of said discharge device to connect said circuit to ground when the voltage of said circuit exceeds a predetermined maximum.

2. A protective device for submarine signaling systems comprising a signaling conductor, a space discharge device controlled by the potential of said conductor, a marginal relay in the output of said space discharge device actuated whenever the potential of said conductor exceeds a predetermined maximum and a second circuit controlled by said relay to reduce the potential of said conductor.

3. A protective device for submarine signaling systems comprising a signaling conductor, a three-electrode vacuum tube device associated with said conductor and responsive to changes in the potential thereof, circuit controlling means actuated by said space discharge device and a relay controlled by said circuit controlling means to complete a circuit connecting said conductor to ground.

4. In a submarine signaling circuit, including a signaling conductor and a sea-earth conductor, means for dissipating any excess potential applied to said conductors, said means comprising a space discharge device, a marginal relay actuated by the output current of said discharge device whenever the potential of said discharge device exceeds a predetermined maximum, and a circuit completed by the actuation of said relay to reduce the potential of said conductors, and an alarm controlled by said circuit.

5. In an electrical circuit, protective means for dissipating any excess potential applied to said circuit comprising means to ground said circuit, an electron discharge device, operating means in the output of said discharge device for actuating said grounding means and means preventing the operation of said operating means when the potential of said circuit is not excessive.

In witness whereof, I hereunto subscribe my name this 26th day of April A. D., 1926.

AUSTEN M. CURTIS.